US006909835B2

(12) United States Patent
Doerr

(10) Patent No.: US 6,909,835 B2
(45) Date of Patent: Jun. 21, 2005

(54) CONFIGURATIONS FOR WAVEGUIDE CROSSINGS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 148 days.

(21) Appl. No.: 10/620,124

(22) Filed: Jul. 15, 2003

(65) Prior Publication Data

US 2005/0013528 A1 Jan. 20, 2005

(51) Int. Cl.[7] .................................................. G02B 6/00
(52) U.S. Cl. ........................ 385/140; 385/14; 385/16; 385/24
(58) Field of Search ............................. 385/14–24, 140

(56) References Cited

U.S. PATENT DOCUMENTS 6,259,834 B1 * 7/2001 Shani ........................... 385/17
6,266,460 B1 * 7/2001 Doerr .......................... 385/16
6,351,581 B1   2/2002 Doerr

* cited by examiner

Primary Examiner—Phan T. H. Palmer

(57) ABSTRACT

Configurations for optical waveguide crossings are described. In one exemplary implementation, an optical chip includes waveguides integrated on the optical chip. The waveguides have varied widths dependent upon how many waveguides each of the waveguides cross with respect to each other. In another exemplary implementation, voids are inserted between waveguides in the vicinity of waveguide crossings of an optical device. The voids are configured to reduce optical losses in waveguides that have more waveguide crossing while simultaneously increasing optical losses in waveguides that have fewer waveguide crossings. Accordingly, the overall optical losses between the waveguides are generally equalized with respect to each other.

20 Claims, 3 Drawing Sheets

CONFIGURATIONS FOR WAVEGUIDE CROSSINGS

TECHNICAL FIELD

The present invention relates generally to optical waveguides, and more particularly, to equalization and reduction of optical losses in waveguides associated with waveguide crossings.

BACKGROUND

Optical waveguides are typically solid conduits formed of light-transmitting material with a higher refractive index than that of its surroundings. Light enters an input of an optical waveguide and is typically reflected at the surfaces of the optical waveguide i.e., the interface between the solid material and the surrounding air. The internal reflection generally occurs along the length of the optical waveguide and tends to maintain light within the optical waveguide.

Waveguides in optical silica chips route light to different locations on the chip. Optical silica chips use planar technology restricting the paths of waveguides to two dimensions. In certain configurations, the paths of waveguides inevitably cross the paths of other waveguides on the same chip. Such crossings tend to result in optical losses caused by interfering cross talk between different waveguides at the junction of the crossing; commonly referred to as scattering. Losses tend to increase in direct proportion to the quantity of waveguide crossings.

Most practical solutions for dealing with losses associated with crossing of waveguides involve equalizing optical losses for the paths of the waveguides. Otherwise, imbalances may result with stronger optical signals overpowering weaker optical signals. One conventional solution used to equalize losses for waveguides is to insert "dummy waveguide crossings" across the paths of waveguides with fewer crossings so that each waveguide has an equal number of crossings. A dummy waveguide crossing is typically a small piece of a waveguide with the same geometric and material quantities of an actual waveguide, but is usually substantially shorter in length. The dummy waveguide is inserted across the path of an actual waveguide for the purpose of masquerading as an actual crossing to introduce the same loss characteristics as an actual waveguide crossing.

Equalizing the quantity of crossings for each waveguide tends to equalize the losses for all the waveguides. Introducing dummy waveguide crossings, however, tends to penalize waveguides with fewer crossings than the waveguide(s) with the most crossings. In other words, by making all the waveguides collectively resemble the worst-case waveguide's path in terms of the number of crossings and total optical loss, one penalizes waveguides whose paths have less actual crossings and hence less optical losses. For example, suppose that the worst-case waveguide's path has five crossing and another waveguide path has only one crossing. To equalize the quantity of losses between the two paths, four dummy waveguide crossings need to be added to the path with only one crossing so that it resembles the waveguide with five crossings.

To complicate matters further, dummy waveguide crossings are not precise and the losses created by them can vary depending on the spacing used between them. That is, the total loss imparted on a waveguide by dummy waveguide crossings may not equal the same loss imparted to the waveguide by actual crossings, depending how far apart each dummy waveguide crossing is spaced. For example, the total loss after a waveguide's path passes through N crossings may actually equal N–1 crossing if the spacing between dummy waveguide crossings is not chosen correctly.

SUMMARY

Configurations for optical waveguide crossings are described. In one exemplary implementation, an optical chip includes waveguides integrated on the optical chip. The waveguides have varied widths dependent upon how many waveguides each of the waveguides cross with respect to each other.

In another exemplary implementation, voids are inserted between waveguides at waveguide crossings of an optical device. The voids are configured to reduce optical losses in waveguides that have more waveguide crossing while simultaneously increasing optical losses in waveguides that have fewer waveguide crossings. Accordingly, the overall optical losses between the waveguides are generally equalized with respect to each other.

BRIEF DESCRIPTION OF THE DRAWINGS

The detailed description is explained with reference to the accompanying figures. In the figures, the left-most digit(s) of a reference number identifies the figure in which the reference number first appears.

DETAILED DESCRIPTION

Silica Waveguide Environment

Figure 1:
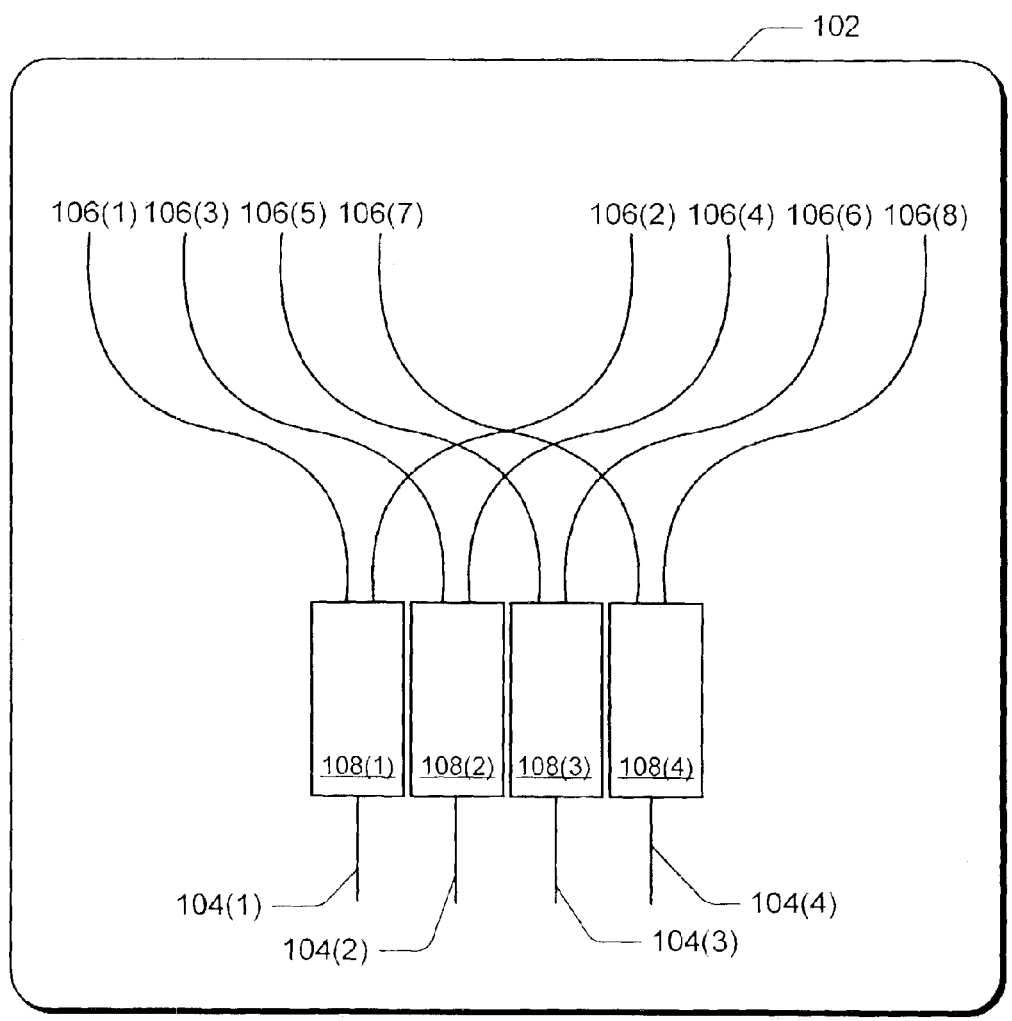
FIG. 1 illustrates various components integrated on an optical chip.

FIG. 1 illustrates various components integrated on an optical chip 102. Optical chip 102 may be any optical device or combination of optical devices that includes waveguides integrated therein. For example, optical chip 102 can be implemented in any number of optical embodiments, such as, but not limited to, a router, switch, computer, network, interferometer, add-drop multiplexer, optical circuit, server, a combination of any of the aforementioned devices, and the like. In the exemplary implementation, optical chip 102 may be silica waveguides on a silicon substrate.

For the purposes of illustration, optical chip 102 includes an array of waveguides 104(1), 104(2), 104(3), and 104(4) that are each split into two separate waveguides 106(1), 106(2), 106(3), 106(4), 106(5), 106(6) 106(7), and 106(8), respectively. An array of 1×2 switches 108(1), 108(2), 108(3), and 108(4) split the array of waveguides, referred to generally as reference number 104 into the separate waveguides referred to generally as reference number 106. Waveguides are typically some type of doped silica waveguides that may be deposited on optical chip 102 using processing steps similar to those used in silicon integrated circuit (IC) technology, which are readily understood in the art. It is to be appreciated that additional waveguides can easily be included in chip 102 or some waveguides illustrated in chip 102 above need not be included.

Although not shown in this example, optical chip 102 may be implemented with any number and combination of differing components. For instance, other elements such as multiplexers, demultiplexers, heating elements, couplers, I/O interfaces, and so forth, are not shown, but could easily be a part of the exemplary optical chip 102. On the other hand, some elements such as 1×2 switches referred to generally as reference number 108 may not necessarily be a part of the exemplary optical chip 102.

In this example, waveguides 106(2), 106(3), 106(4), 106(5), 106(6), and 106(7) cross each other. Waveguides 106(2) and 106(7) each cross three other waveguides, respectively; waveguides 106(4) and 106(5) each cross two other waveguides, respectively; waveguides 106(3) and 106(6) each cross one other waveguide, respectively; and waveguides 106(1) and 106(8) do not cross any other waveguides.

Accordingly, waveguides 106(2) and 106(7) cross a greater quantity of waveguides than any other of the waveguides, and hence are subjected to higher optical losses. Waveguides 106(4) and 106(5) cross fewer waveguide crossings than waveguides 106(2) and 106(7), but still have higher optical losses than waveguides 106(1), 106(3), 106(6), and 106(8). Waveguides 106(3) and 106(6) experience less optical losses than the other waveguides, except 106(1) and 106(8), which are not subjected to optical losses as a result of not crossing any other waveguides.

As described above, conventional solutions used dummy waveguide crossings to equalize optical losses, making all path losses equal to the worst-case waveguide loss. In the example, shown in FIG. 1, this would involve making all the waveguides have worst-case losses associated equal to those of waveguides 106(2) and 106(7).

Described herein are two exemplary implementations that may be used individually or in combination with each other to equalize losses among planar waveguides while simultaneously reducing overall losses for the waveguides, collectively. In one implementation, varying the widths of the waveguides both reduces and helps to equalize losses in the waveguides. In another implementation, one or more voids are inserted at the crossing between certain waveguides. The voids are configured to reduce overall optical losses between them while, again, equalizing losses between them. In both implementations, there is a generally a decrease in losses associated with waveguides experiencing worst-case losses. Accordingly, by decreasing the losses for the worst case, there is an overall reduction in losses for all waveguides when equalizing losses.

Variation of Waveguide Widths

Figure 2:
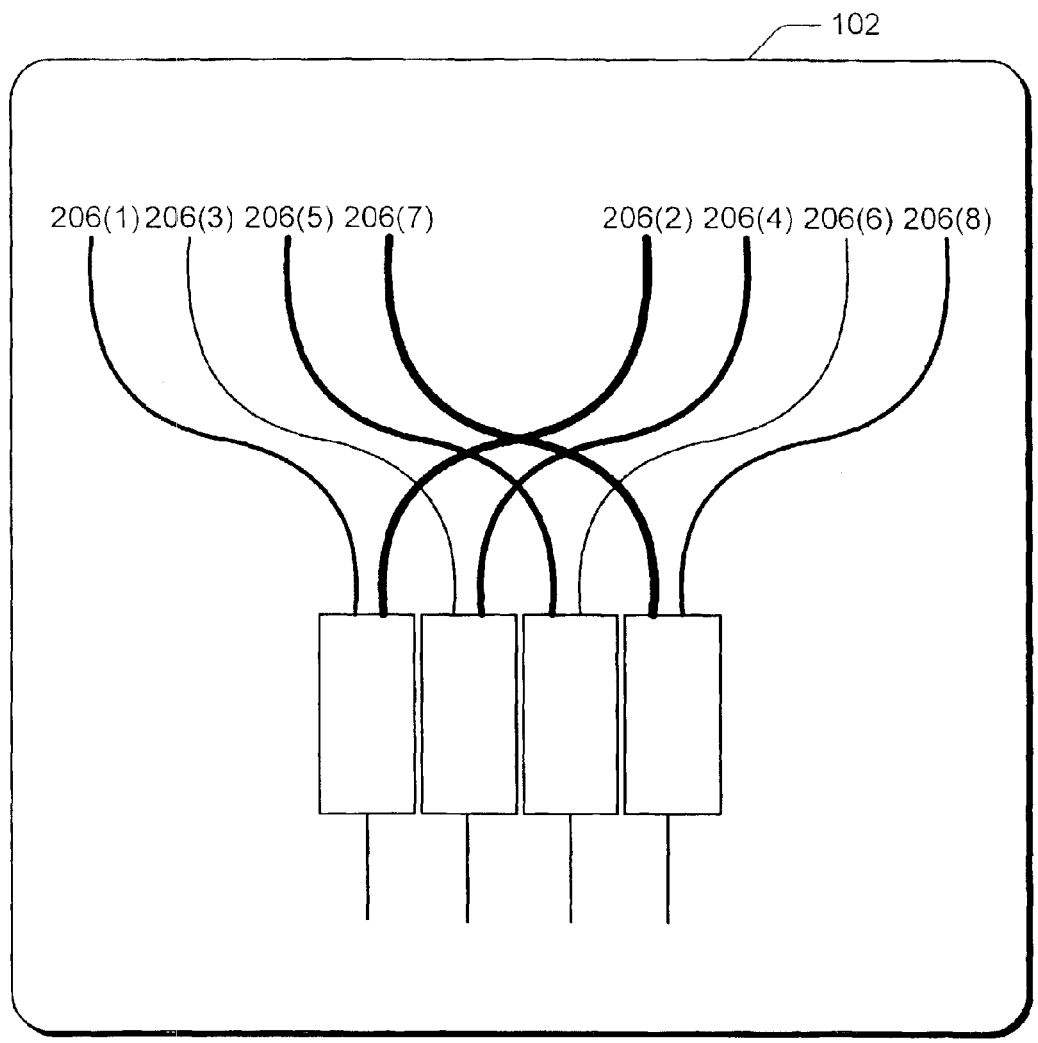
FIG. 2 shows an exemplary implementation that may be used to equalize and reduce optical losses in waveguides associated with waveguide crossings.

FIG. 2 shows an exemplary implementation that may be used to equalize and reduce optical losses in waveguides associated with waveguide crossings. FIG. 2 is similar to FIG. 1, except the widths of waveguides 206 are varied dependent upon how many of waveguides each of the waveguides cross with respect to each other. As shown in FIG. 2, a wider width is selected for a portion of the waveguides 206(2) and 206(7) with a greater quantity of waveguides crossed when compared to another portion of the waveguides, such as 206(1), 206(3), 206(4), 206(5), 206(6), and 206(8) with a fewer quantity of waveguides crossed. A narrower width is selected for a portion of the waveguides 206 with 206(1), 206(3), 206(4), 206(5), 206(6), and 206(8) with a fewer quantity of waveguides crossed when compared to another portion of the waveguides 206(2) and 206(7) with a greater quantity of waveguides crossed.

Accordingly, the width selection tends to go progressively from widest to narrowest widths depending on how many waveguides are crossed with respect to each other. There is an exception for waveguides with no crossings, such as waveguides 206(1) and 206(8). These two waveguides do not necessarily have the narrowest widths. For waveguides 206(1) and 206(8) a width is chosen that is optimal in terms of losses, but that most closely resembles the average optical loss characteristics of the other waveguides.

When wider waveguides cross narrower waveguides, the wider waveguide tends to experience less loss than if the wider waveguide had a narrower width. Additionally, by crossing a narrower waveguide, the wider waveguide has a shorter region to cross associated with optical losses. There is also less divergence and diffraction of the beam traveling through a wider waveguide. Thus, when two waveguides cross, the one with the largest width tends to experience less loss, because there is a smaller angular spectrum. It is noted that widening a waveguide past a certain point will decrease performance of a waveguide. Also, if a waveguide is bending, widening it past a certain point no longer widens the optical mode. This is because of the centrifugal force of the bend. Additionally, narrowing a waveguide, such as waveguides 206(3) and 206(6) past a certain point can actually be counterproductive causing the waveguide to actually behave in a wider waveguide mode.

Therefore, there are maximum and minimum ranges of widths that may be chosen for waveguides depending on the application. In the exemplary implementation, the maximum width for the widest waveguides 206(2) and 206(7) is between about 6 microns and 11 microns. In contrast, the narrowest width waveguides 206(3) and 206(6) is between about four microns and six microns. It should be noted that these are approximate ranges, and these ranges may vary depending on the IC processes used, the size of the overall chip and waveguides used in a particular application.

Waveguide Voids

Figure 3:
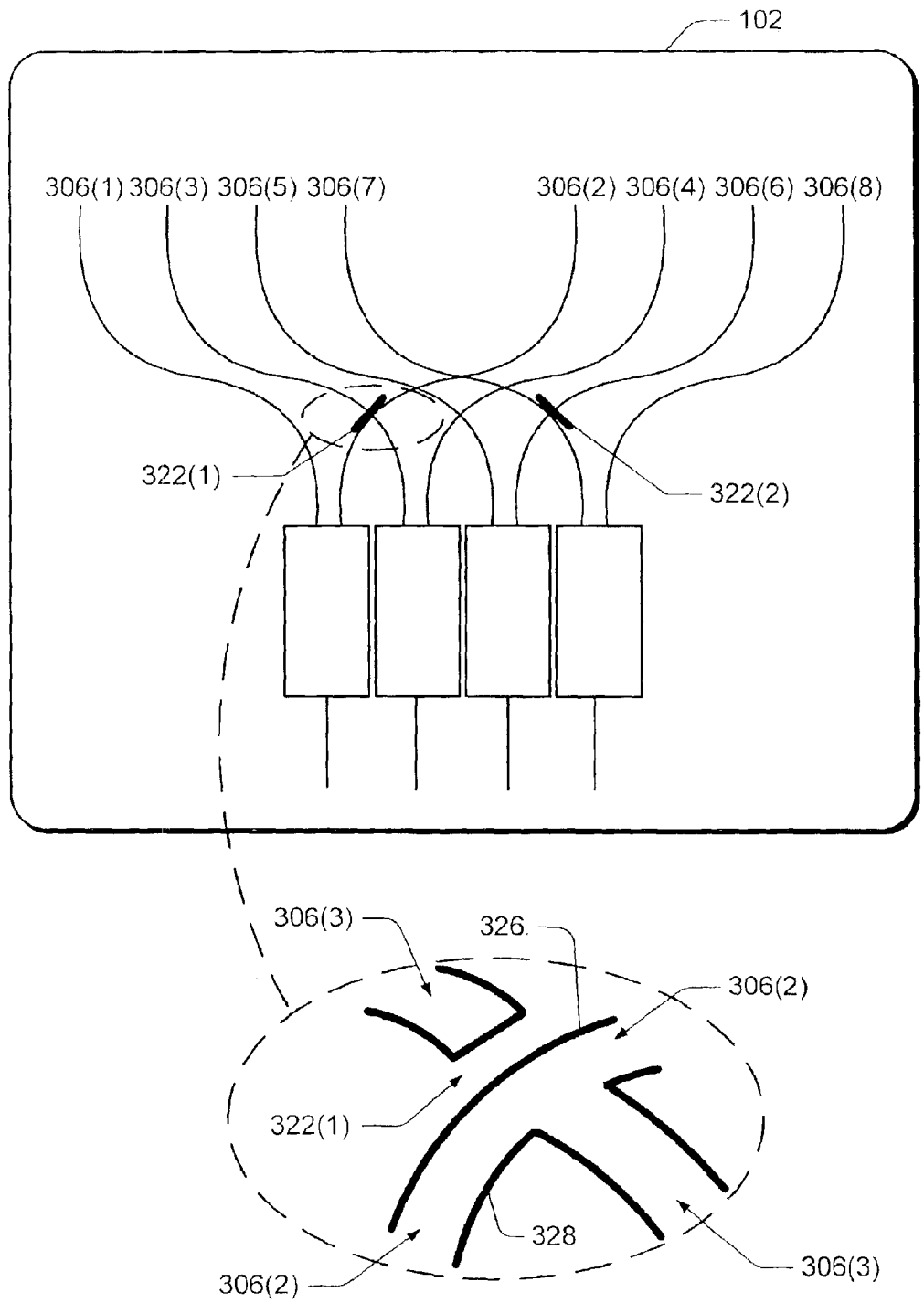
FIG. 3 shows another exemplary implementation that may be used to equalize and reduce optical losses in waveguides associated with waveguide crossings.

FIG. 3 shows another configuration that may be used to equalize and reduce optical losses in waveguides associated with waveguide crossings. FIG. 3 is similar to FIGS. 1 and 2, except voids 322(1) and 322(2) are inserted in a vicinity adjacent to a crossing between the waveguides 306(2) and 306(3) and waveguides 306(6) and 306(7). In this example, waveguides 306(2) and 306(7) cross the greatest quantity of other waveguides and the waveguides 306(3) and 306(7) cross the fewest quantity of waveguides, with respect to those waveguides that have any crossings (e.g., waveguide crossings 306(1) and 306(8) do not cross any other waveguides). The voids referred to generally as reference number 322 could easily be inserted at other junctions of waveguide crossings, but for discussion purposes is only shown at the crossings of the aforementioned waveguides. Each void 322 forms a small gaps between the waveguides at their crossing. The voids may take any shape possible to be integrated into waveguide using IC processing. In the exemplary implementation, the voids 322 are extremely small gaps separating two waveguides measuring about 2 microns. However, it is appreciated that voids may be larger or smaller.

As shown in FIG. 3, voids 322(1) and 322(2) are generally parallel to and adjacent to a longitudinal axis of waveguides 306(2) and 306(7), respectively. The longitudinal axis is generally a lengthwise direction for the flow of light through a waveguide. In contrast, voids 322(1) and 322(2) are generally perpendicular to and inserted across a horizontal axis of waveguides 306(3) and 306(6), respectively.

Typically, void 322 is placed adjacent to the exterior side 326 of bends of waveguides 306(2) and 306(7) at their respective crossings with waveguides 306(3) and 306(6). If there are no bends, voids may be inserted adjacent to both sides of the waveguides having more crossings. However, placing voids on both the interior side 328 and exterior side 326 of a bend may not help waveguides with more crossings, because the majority of wave fields tend to be concentrated on the exterior side of a waveguide.

Each void 322 is configured to reduce optical losses in waveguides 306(2) and 306(7), while simultaneously increasing optical losses in waveguides 306(3) and 306(6), such that the overall optical losses between the waveguides 306(2), 306(7) and waveguides 306(3), 306(6) are more equalized with respect to each other.

For instance, referring to the crossing of waveguide 306(2) and 306(3), void 322(1) penalizes waveguide 306(3) (the waveguide with fewer crossings) by causing light to pass through voids 322. At the same time, the void 322(1) assists waveguide 306(2) by preventing light from escaping waveguide 306(2) into waveguide 306(3) at the junction (e.g., crossing) of the two waveguides.

One way to deposit voids in the vicinity of junctions of two waveguides in a mask design is by making patterns run along a stretch of the waveguide with a higher quantity of crossings and then subtracting the patterns from the other waveguides. Voids 322 may be beneficial if the quantity of crossings per waveguide is greater than the absolute value of 2, e.g., $|N_1-N_2|>2$, where N is the quantity of crossings per a particular waveguide.

It is noted that the two exemplary implementations (widening and narrowing waveguides and using voids) may be used simultaneously providing more equalization capability. If the combination of both configurations does not provide desired equalization, dummy crossing may also be used in combination with either of the two exemplary implementations described herein.

It is also to be appreciated that waveguide configurations come in a wide variety of forms, and for purposes of this discussion any of these variety of forms may be included. It is also noted that the Figures are not drawn to scale. Accordingly, the positioning, style, and sizes of the elements shown may vary and should not be construed as a limitation.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An optical chip, comprising: waveguides integrated on the optical chip, the waveguides having varied widths dependent upon how many waveguides each of the waveguides cross with respect to each other.

2. The optical chip as recited in claim 1, wherein a wider width is selected for a portion of the waveguides with a greater quantity of waveguides crossed when compared to another portion of the waveguides with a fewer quantity of waveguides crossed.

3. The optical chip as recited in claim 1, wherein a narrower width is selected for a portion of the waveguides with a fewer quantity of waveguides crossed when compared to another portion of the waveguides with a greater quantity of waveguides crossed.

4. The optical chips as recited in claim 1, wherein the widths are varied to equalize optical losses associated with waveguides that cross a greater quantity of waveguides when compared to waveguides that cross a fewer quantity of waveguides.

5. The optical chips as recited in claim 1, wherein the widths are varied to reduce optical losses associated with waveguides that cross a greater quantity of waveguides and increase optical losses associated with waveguides that cross a fewer quantity of waveguides, such that the overall optical losses between the waveguides that cross a greater quantity of waveguides and the waveguides that cross a fewer quantity of waveguides are more equalized with respect to each other.

6. An optical chip, comprising:
    a first waveguide having a width X;
    a second waveguide having a width Y, the second waveguide crossing the first waveguide; and
    a plurality of other waveguides, wherein a greater quantity of the plurality of other waveguides cross the first waveguide than the second waveguide, and wherein the width X for the first waveguide is wider than the width Y for the second waveguide.

7. The optical chip as recited in claim 6, further including a third waveguide that does not cross any other waveguides on the chip and has a width Z, which is wider than the width Y, but narrower than the width X.

8. The optical chip as recited in claim 6, wherein the width X is between about 6 microns and 11 microns.

9. The optical chip as recited in claim 6, wherein the width Y is between about 4 microns and 6 microns.

10. The optical chip as recited in claim 6, wherein the width X for the first waveguide is made wider than the width Y for the second waveguide to decrease optical losses associated with crossing more waveguides than the second waveguide.

11. The optical chip as recited in claim 6, wherein the width Y for the second waveguide is made narrower than the width X for the first waveguide to increase optical losses associated with crossings less waveguides than the first waveguide.

12. The optical chip as recited in claim 6, wherein the width X for the first waveguide is made wider than the width Y for the second waveguide to decrease optical losses associated with crossings more waveguides than the second waveguide, and the width Y for the second waveguide is made narrower than the width X for the first waveguide to increase optical losses associated with crossings fewer waveguides than the first waveguide, such that the overall optical losses between the first and second waveguides are more equalized with respect to each other.

13. An optical chip, comprising:
    a first waveguide;
    a second waveguide that crosses the first waveguide;
    a plurality of other waveguides, wherein a greater quantity of the plurality of other waveguides cross the first waveguide than the second waveguide; and
    a void inserted in vicinity of the crossing between the first and second waveguides, the void configured to reduce optical losses in the first waveguide and simultaneously increase optical losses in the second waveguide, such that the overall optical losses between the first and second waveguides are substantially equalized with respect to each other.

14. The optical chip as recited in claim 13, wherein the void provides a gap of about 2 microns between the first and second waveguides.

15. The optical chip as recited in claim 13, wherein the void in the first waveguide is generally parallel to a longitudinal axis of the first waveguide.

16. The optical chip as recited in claim 13, wherein the void in the second waveguide is generally perpendicular to a longitudinal axis of the second waveguide.

17. A method, comprising: varying widths of waveguides that cross each other in an optical device, by making a width of one or more of the waveguides that have more crossing wider than a width of one or more the waveguides that experience fewer crossing.

18. The method as recited in claim 17, wherein the widths are varied to reduce optical losses associated with waveguides that cross a greater quantity of waveguides and increase optical losses associated with waveguides that cross a fewer quantity of waveguides, such that the overall optical losses between the waveguides that cross a greater quantity of waveguides and the waveguides that cross a fewer quantity of waveguides are more equalized with respect to each other.

19. A method comprising: inserting one or more voids between waveguide crossings of on an optical device, the one or more voids configured to reduce optical losses in waveguides that have more waveguide crossings and simultaneously increase optical losses in waveguides that have fewer waveguide crossings, such that the overall optical losses between the waveguides with more waveguide crossings and the waveguides with fewer waveguides crossings are more equalized with respect to each other.

20. The method as recited in claim 19, wherein the one or more voids are inserted between waveguide crossings generally parallel to a longitudinal axis of the waveguides that have more waveguide crossings and generally perpendicular to a longitudinal axis of the waveguides that have fewer waveguide crossings.

* * * * *